US008473091B2

(12) United States Patent
Nagano

(10) Patent No.: US 8,473,091 B2
(45) Date of Patent: Jun. 25, 2013

(54) CONTROL APPARATUS OF MACHINE TOOL AND METHOD OF CONTROLLING OPERATION OF THE SAME

(75) Inventor: Takashi Nagano, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 205 days.

(21) Appl. No.: 13/029,870

(22) Filed: Feb. 17, 2011

(65) Prior Publication Data

US 2011/0208346 A1 Aug. 25, 2011

(30) Foreign Application Priority Data

Feb. 23, 2010 (JP) ................................. 2010-036854

(51) Int. Cl.
G06F 19/00 (2011.01)

(52) U.S. Cl.
USPC .............................. 700/159; 705/301; 29/563

(58) Field of Classification Search
USPC .............................. 700/159; 705/301; 29/563
See application file for complete search history.

(56) References Cited

U.S. PATENT DOCUMENTS

| 4,209,847 | A | 6/1980 | Noda et al. | |
|---|---|---|---|---|
| 4,229,804 | A | 10/1980 | Kobayashi et al. | |
| 6,182,163 | B1 * | 1/2001 | Yamashita et al. | 710/12 |
| 6,317,646 | B1 * | 11/2001 | de Caussin et al. | 700/173 |
| 6,708,385 | B1 * | 3/2004 | Lemelson | 29/563 |
| 7,065,856 | B1 * | 6/2006 | Lemelson | 29/563 |
| 7,343,660 | B1 * | 3/2008 | Lemelson | 29/563 |
| 2002/0004688 | A1 * | 1/2002 | Kojima et al. | 700/193 |
| 2006/0041448 | A1 * | 2/2006 | Patterson et al. | 705/1 |

FOREIGN PATENT DOCUMENTS

| EP | 0416344 A2 | 3/1991 |
|---|---|---|
| JP | 8-1482 | 1/1996 |
| JP | 2002-49413 | 2/2002 |

OTHER PUBLICATIONS

Extended European Search Report received in corresponding European application No. 11154473.0, dated Jun. 1, 2011, 6 pages.
esp@cenet patent abstract for Japanese Publication No. 2002049413, Publication date Feb. 15, 2002 (1 page).
esp@cenet patent abstract for Japanese Publication No. 8001482, Publication date Jan. 9, 1996 (1 page).

* cited by examiner

Primary Examiner — Mohammad Ali
Assistant Examiner — Anthony Whittington
(74) Attorney, Agent, or Firm — Osha Liang LLP

(57) ABSTRACT

A control apparatus of a machine tool is adapted to detect whether or not an NC program is stopped at an end of a block and whether or not a rotation of a handwheel for a manual pulse generator is stopped and restarted when both a manual pulse mode and a single block mode are selected. The NC program is accordingly automatically restarted from the next block in conjunction with the restart of the handwheel rotation. The operator thus can restart an operation of an NC unit only by rotating the handwheel when the operation is automatically stopped at the end of a block of the NC program.

2 Claims, 4 Drawing Sheets

CONTROL APPARATUS OF MACHINE TOOL AND METHOD OF CONTROLLING OPERATION OF THE SAME

BACKGROUND OF THE INVENTION

1. Field of the Invention

The present invention relates to a control apparatus of a machine tool and a method of controlling an operation of the machine tool. In particular, the present invention provides a preferable technique for use with a machine tool equipped with a manual pulse generator for a manual operation.

2. Description of the Related Art

At present, a numerical control (NC) method using an NC program is used as one of numerical control methods of machine tools. The NC program is a program that includes code systems such as G-code that represents commands for moving a spindle, a tool post, and so forth, T-code that represents commands for calling tools to be used, and M-code that represents auxiliary function commands. In the NC method, a numerical control unit (NC unit) of the machine tool reads the NC program one block (line) after another, interprets commands (NC code) in the block, and sequentially executes the commands.

In general, several operation modes are provided for the NC machine tool. For example, there are an "automatic operation mode" in which the machine tool automatically operates in accordance with the NC program, a "single block mode" in which the operation of the NC unit is stopped after one block of the NC program has been executed, a "manual pulse mode" in which the NC program is executed in conjunction with rotation of a handwheel for a manual pulse generator which is rotated by an operator, and so forth. The handwheel for the manual pulse generator is generally provided on an operation panel of the machine tool (for example, refer to Japanese Unexamined Patent Application Publication No. 2002-49413). There are also machine tools for which the handwheel can be separated from the operation panel while being connected to the operation panel with a cable so as to allow the operator to have the handwheel at hand for operation.

The single block mode is often used during the setup stage prior to the automatic operation since the operation based on the NC program can be checked for every single block. When operated with the single block mode selected, the NC unit automatically stops the operation thereof when one block of the NC program has been executed. This accordingly stops the movement of the spindle and the tool post. This allows the operator to stop the execution of the NC program at a particular block and to check how an object to be machined (a workpiece) is machined, the condition of the tools, how a cutting lubricant is applied, and so forth.

The manual pulse mode is also used during the setup stage prior to the automatic operation. When the manual pulse mode is selected, the operator initially operates the operation panel so as to select the spindle and the tool post to be moved, and to select a multiplier that represents a movement amount of the spindle or the tool post per unit revolution of the handwheel. After that, when the operator rotates the handwheel for the manual pulse generator at a desired speed in a normal direction or a reverse direction, the NC program is executed in a forward direction or a reverse direction in accordance with the direction and the speed of the rotation of the handwheel, thereby moving the selected spindle or tool post in accordance with the execution of the NC program (for example, refer to Japanese Unexamined Patent Application Publication No. 8-1482).

According to a technique disclosed in Japanese Unexamined Patent Application Publication No. 8-1482, in an automatic operation start/pause mode, an NC unit starts an automatic operation when the rotation of a handwheel for a manual pulse generator is detected to be started and stops the automatic operation when the rotation of the handwheel is detected to be stopped.

The manual pulse mode (and similarly, the automatic operation start/pause mode according to Japanese Unexamined Patent Application Publication No. 8-1482) is useful since the handwheel can be rotated in the following manner. That is, the handwheel can be rotated at a high speed to quickly move the spindle or the tool post when a detailed check is not needed. When a detailed check is desirable for checking interference of a workpiece with a tool or the like, the handwheel can be rotated at a low speed to slowly move the spindle or the tool post to allow checking of the movement. In addition, when the rotation of the handwheel is stopped, the execution of the NC program is also stopped. Thus, the movement of the spindle and the tool post can be stopped. However, it is very likely that the rotation of the handwheel is stopped before the current block of the NC program is finished. It is difficult for the operator to stop the execution of the NC program exactly when the execution of one block is just finished.

To solve this issue, many machine tools allow combined selection of both the manual pulse mode and the single block mode. When both the manual pulse mode and the single block mode are selected, the NC program is executed in a forward direction or a reverse direction in accordance with the rotation of the handwheel for the manual pulse generator and is automatically stopped at the end of the block. This allows the operator to efficiently check the NC program in a production setup.

However, in the above-described example of the related art, when the NC unit is operated with both the manual pulse mode and the single block mode selected, it is required to perform a complicated task in order to restart the operation of the NC unit after the execution of the NC program is automatically stopped at the end of the block. That is, to start the automatically stopped NC unit, two operations, which are pressing of a start button on an operation panel and, after that, rotating of the handwheel for the manual pulse generator, need to be performed. When the start button and the handwheel are provided at locations away from each other, and in particular in such a case where the handwheel is used in such a manner that the handwheel is separated from the operation panel while being connected thereto with a cable, operability in restarting the operation is degraded.

SUMMARY OF THE INVENTION

The present invention proposes a technique to solve the above problem. An object of the present invention is to improve operability in restarting an operation after execution of an NC program is automatically stopped at an end of a block when an NC unit is operated with both a manual pulse mode and a single block mode selected, and to further increase work efficiency in a production setup.

To solve the above-described problem, according to the present invention, when the NC unit is operated with both the manual pulse mode and the single block mode selected, the execution of the NC program is performed as follows. That is, when it is detected that the execution of the NC program has been stopped at the end of the block, and after that, it is detected that rotation of a handwheel for a manual pulse generator has been stopped and then restarted, the execution of the NC program is caused to start from the next block.

According to the present invention configured as above, execution of the NC program can be automatically restarted in conjunction with the restarting of the rotation of the handwheel that has been stopped after the NC program was automatically stopped at the end of the block due to the function of the single block mode. Thus, when the NC unit is operated with both the manual pulse mode and the single block mode selected, the operator can restart the execution of the NC program by simply performing a single operation, that is, rotating the handwheel for the manual pulse generator. This allows operability in restarting the operation to be improved and work efficiency in a production setup to be increased.

DESCRIPTION OF THE PREFERRED EMBODIMENTS

Figure 1:
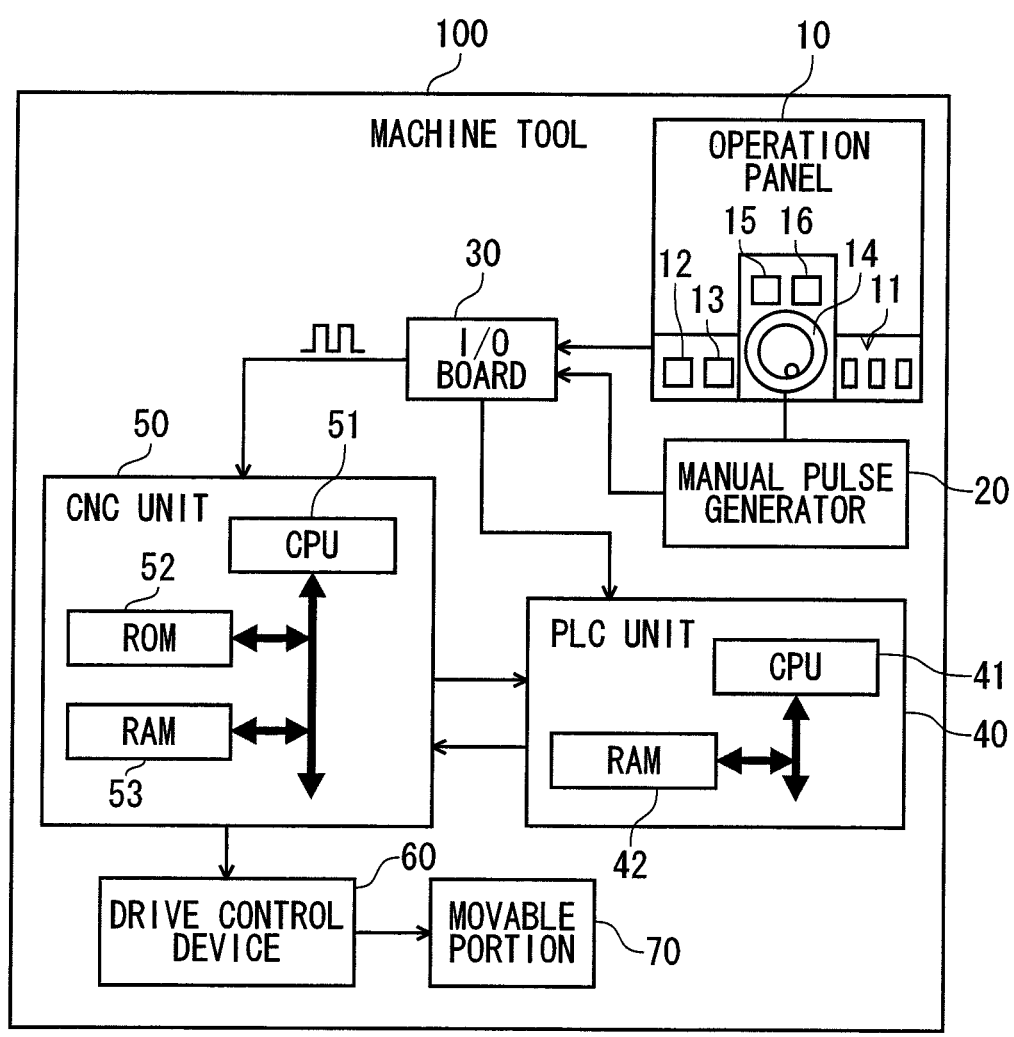
FIG. 1 is a diagram illustrating an example of a main hardware configuration used in a machine tool including a control apparatus according to an embodiment.

An embodiment according to the present invention will be described below with reference to the drawings. FIG. 1 is a diagram illustrating an example of a main hardware configuration used in a machine tool 100 having a control unit according to the present embodiment. As illustrated in FIG. 1, the machine tool 100 according to the present embodiment includes an operation panel 10, a manual pulse generator 20, an input/output (I/O) board 30, a programmable logic controller (PLC) unit 40, a computer numerical control (CNC) unit 50, a drive control device 60, and a movable portion 70. Here, the CNC unit 50 corresponds to a numerical control (NC) unit.

The operation panel 10 includes controls for an operator to cause the machine tool 100 to perform a variety of operations. The controls include mode selection switches 11 for selecting operation modes, a start switch 12 for starting an operation of the NC unit (execution of an NC program), a stop switch 13 for stopping the operation of the NC unit, a handwheel 14 for the manual pulse generator 20, an object selection switch 15 for selecting a spindle and a tool post to be moved by rotating the handwheel 14, and a multiplier selection switch 16 for selecting a multiplier that represents a movement amount of the spindle or the tool post per unit revolution of the handwheel 14. The operation panel 10 outputs operation signals received from the above controls to the PLC unit 40 via the I/O board 30.

The manual pulse generator 20 generates pulse signals in accordance with the rotational operation of the handwheel 14. The pulse signals generated with the manual pulse generator 20 are output to the PLC unit 40 and the CNC unit 50 via the I/O board 30. Although FIG. 1 illustrates an example where the handwheel 14 for the manual pulse generator 20 is provided on the operation panel 10, the handwheel 14 may be separated from the operation panel 10 while being connected to the operation panel 10 with a cable so as to allow the operator to have the handwheel 14 at hand for operation.

The PLC unit 40 includes a central processing unit (CPU) 41 and a random access memory (RAM) 42. The CPU 41 executes predetermined processes in accordance with a sequence ladder program stored in the RAM 42. More specifically, the CPU 41 receives the operation signal output from the operation panel 10 via the I/O board 30 and controls the CNC unit 50 in accordance with the input operation signal.

For example, when the start switch 12 of the operation panel 10 is pressed, the PLC unit 40 outputs to the CNC unit 50 a start command for starting the operation of the NC unit in accordance with the operation signal received from the operation panel 10 via the I/O board 30. When the stop switch 13 is pressed, the PLC unit 40 outputs to the CNC unit 50 a stop command for stopping the operation of the NC unit in accordance with the operation signal received from the operation panel 10 via the I/O board 30.

When one of an automatic operation mode, a single block mode, and a manual pulse mode is selected by operating the mode selection switches 11, the PLC unit 40 outputs to the CNC unit 50 a mode set command for setting the selected operation mode in accordance with the operation signal received from the operation panel 10 via the I/O board 30. When the object selection switch 15 is operated, the PLC unit 40 outputs to the CNC unit 50 an object select command for selecting the spindle and the tool post to be moved in accordance with the operation signal received from the operation panel 10 via the I/O board 30. When the multiplier selection switch 16 is operated, the PLC unit 40 outputs to the CNC unit 50 a multiplier select command for selecting a multiplier in accordance with the operation signal received from the operation panel 10 via the I/O board 30.

The PLC unit 40 corresponds to the control apparatus of the present invention. The PLC unit 40 controls the operation when both the manual pulse mode and the single block mode are selected. More specifically, when both the manual pulse mode and the single block mode are selected, the PLC unit 40 operates as follows. That is, when the PLC unit 40 detects that execution of an NC program is stopped at the end of a block and then detects that the rotation of the handwheel 14 is stopped and then started, the PLC unit 40 outputs a restart command to the CNC unit 50 so as to automatically start the execution of the NC program from the next block. More details about this control will be described below with reference to FIG. 2.

The CNC unit 50 includes a CPU 51, a read-only memory (ROM) 52, and a RAM 53. The CPU 51 executes predetermined processes in accordance with a variety of programs stored in the ROM 52 and the RAM 53. The RAM 53 stores the NC program. The NC program is a program that includes code systems such as G-code that represents commands for moving the spindle, the tool post, and so forth of the movable portion 70, T-code that represents commands for calling tools to be used, and M-code that represents auxiliary function commands.

The CPU 51 controls the drive control device 60 as follows. That is, the CPU 51 reads the NC program from the RAM 53 one block (line) after another, interprets the commands (NC code) in the block, and sequentially executes the commands while referring to data required for executing the commands. The drive control device 60 controls driving of the spindle and the tool post of the movable portion 70 in accordance with an operation command received from the CNC unit 50.

More specifically, when the CNC unit 50 is set to the automatic operation mode by the mode set command received from the PLC unit 40, the CNC unit 50 starts the execution of the NC program in accordance with the start command received from the PLC unit 40 and sequentially executes the commands by reading the codes in the NC program one block after another from the RAM 53. The CNC unit 50 stops the execution of the NC program upon receiving the stop command from the PLC unit 40 during such an automatic operation.

When the CNC unit 50 is set to the manual pulse mode by the mode set command received from the PLC unit 40, the CNC unit 50 sequentially executes the commands by executing the NC program in a forward direction or a reverse direction in accordance with the pulse signals received from the manual pulse generator 20 via the I/O board 30.

When the CNC unit 50 is set to the single block mode by the mode set command received from the PLC unit 40, the CNC unit 50 starts the execution of the NC program in accordance with the start command received from the PLC unit 40 and automatically stops the execution when one block of the NC program has been executed. If the execution of the NC program is stopped at the end of the block when the single block mode is selected, the CNC unit 50 outputs a block stop signal representing the fact that the execution of the program has been stopped at the end of the block to the PLC unit 40.

When the CNC unit 50 is set to both the manual pulse mode and the single block mode, the CNC unit 50 sequentially executes the commands by executing the NC program in a forward direction or a reverse direction in accordance with the pulse signals received from the manual pulse generator 20 via the I/O board 30. The CNC unit 50 automatically stops the execution when the execution of the NC program reaches the end of the block. At this time, the CNC unit 50 outputs the block stop signal to the PLC unit 40. The CNC unit 50, upon receiving the restart command from the PLC unit 40, restarts the execution of the NC program from the block that comes immediately after the block where the execution was automatically stopped.

The CNC unit 50 sets an in-operation flag held in the RAM 53 to ON when the CNC unit 50 is automatically operated in the automatic operation mode or manually operated in the manual pulse mode (this does not necessarily mean that the handwheel 14 is actually rotating). The CNC unit 50 sets the in-operation flag held in the RAM 53 to OFF when the execution of the NC program is stopped in the automatic operation mode or the execution of the NC program is stopped at the end of the block in the single block mode.

Figure 2:
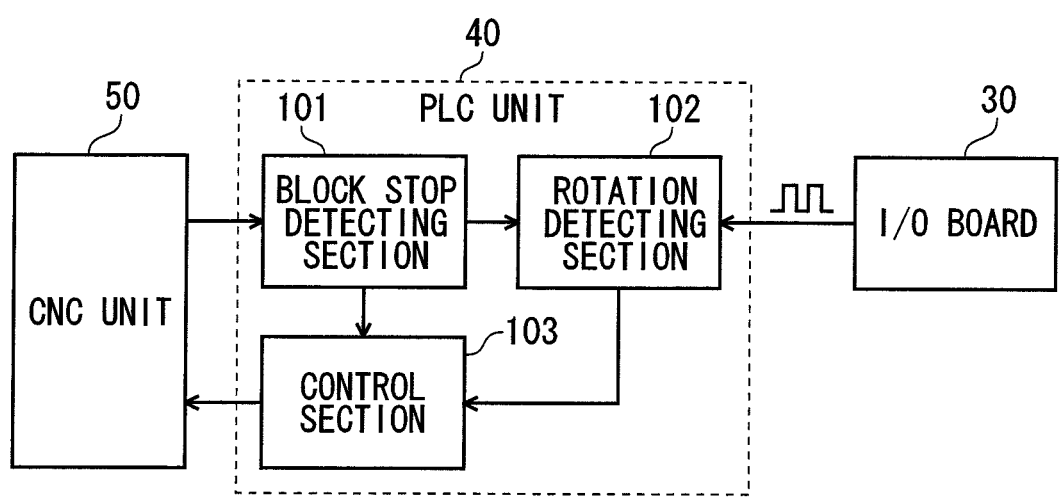
FIG. 2 is a diagram illustrating an example of a main functional configuration of a PLC unit according to the embodiment.

FIG. 2 is a diagram illustrating an example of a main functional configuration of the PLC unit 40 according to the present embodiment. As illustrated in FIG. 2, the PLC unit 40 according to the present embodiment includes a block stop detecting section 101, a rotation detecting section 102, and a control section 103, which correspond to functions achieved with the CPU 41 in accordance with the sequence ladder program stored in the RAM 42.

The block stop detecting section 101 detects that the execution of the NC program has been stopped at the end of the block when both the manual pulse mode and the single block mode are selected. More specifically, the block stop detecting section 101 determines that the execution of the NC program has been stopped at the end of the block when the block stop detecting section 101 receives the block stop signal from the CNC unit 50. Alternatively, instead of by monitoring whether or not the block stop signal is received, the block stop detecting section 101 may detect that the execution of the NC program has been stopped at the end of the block by monitoring whether or not the in-operation flag held in the RAM 53 of the CNC unit 50 is set to OFF when the single block mode is selected.

After the block stop detecting section 101 detects that the execution of the NC program has been stopped at the end of the block, the rotation detecting section 102 detects the stopping of the rotation of the handwheel 14 for the manual pulse generator 20 and the restarting of the rotation. More specifically, the rotation detecting section 102 determines that the rotation of the handwheel 14 has been stopped when the input of the pulse signals from the manual pulse generator 20 via the I/O board 30 is stopped (for example, when there is no input of a following pulse signal for 500 msec). The rotation detecting section 102 determines that the rotation of the handwheel 14 has been restarted when the input of the pulse signals from the manual pulse generator 20 via the I/O board 30 is restarted.

The control section 103 controls the operation such that the execution of the NC program is started from the next block when the block stop detecting section 101 detects that the execution of the NC program has been stopped at the end of the block and the rotation detecting section 102 detects that the rotation of the handwheel 14 has been stopped and restarted. More specifically, the control section 103 controls the operation so as to automatically start the execution of the NC program from the next block by outputting the restart command to the CNC unit 50.

Figure 3:
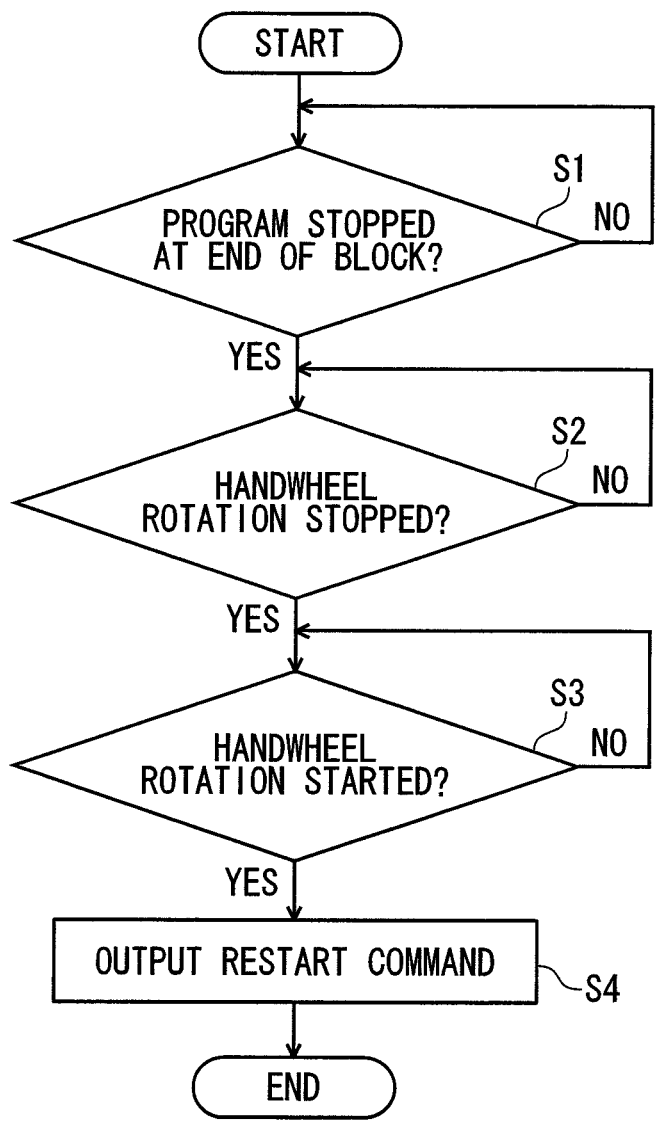
FIG. 3 is a flowchart illustrating an example of an operation performed by the PLC unit according to the embodiment.

FIG. 3 is a flowchart illustrating an example of an operation performed by the function blocks 101 to 103 of the PLC unit 40 as illustrated in FIG. 2. According to the flowchart illustrated in FIG. 3, the operation starts when the NC unit is operated with both the manual pulse mode and the single block mode selected. Initially, the block stop detecting section 101 determines whether or not the execution of the NC program has been stopped at the end of the block (in step S1). If the block stop detecting section 101 determines that the execution of the NC program has not been stopped at the end of the block, the block stop detecting section 101 continues to perform the same determination in step S1.

If the block stop detecting section 101 determines that the execution of the NC program has been stopped at the end of the block, then the rotation detecting section 102 determines whether or not the rotation of the handwheel 14 for the manual pulse generator 20 has been stopped (in step S2). If the rotation detecting section 102 determines that the rotation of the handwheel 14 has not been stopped, the rotation detecting section 102 continues to perform the same determination in step S2.

If the rotation detecting section 102 determines that the rotation of the handwheel 14 has been stopped, then the rotation detecting section 102 determines whether or not the rotation of the handwheel 14 has been started (in step S3). If the rotation detecting section 102 determines that the rotation of the handwheel 14 has not been started, the rotation detecting section 102 continues to perform the same determination in step S3. If the rotation detecting section 102 determines that the rotation of the handwheel 14 has been started, then the control section 103 outputs the restart command to the CNC unit 50 so as to start the execution of the NC program from the next block (in step 4).

Figure 4:
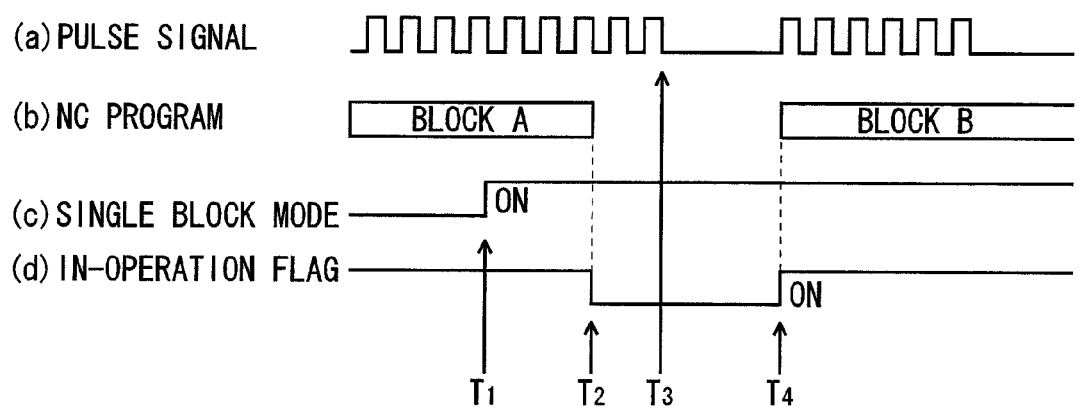
FIG. 4 is a timing chart illustrating an example of an operation performed by the machine tool according to the embodiment.

FIG. 4 is a timing chart illustrating an example of the operation performed by the machine tool 100 according to the present embodiment. In FIG. 4, the state of the pulse signals output from the manual pulse generator 20 is illustrated by (a). The pulse signals are output only when the handwheel 14 is rotated. The state of the NC program having a plurality of blocks is illustrated by (b). Here, Block A and Block B are two successive blocks. The setting state of the single block mode is illustrated by (c). When the single block mode is set, the state is ON, and when the single block mode is not set, the state is OFF. The state of the in-operation flag is illustrated by (d). When the NC program is executed, the flag is set to ON, and when the execution of the program is stopped, the flag is set to OFF.

In the example illustrated in FIG. 4, the Block A of the NC program is executed by rotating the handwheel 14 in the manual pulse mode. The single block mode is then set at timing $T_1$ during the execution of Block A. At this timing, the in-operation flag remains ON. By continuing the rotation of the handwheel 14, the NC program is continued to be executed in accordance with the pulse signals output from the manual pulse generator 20. Then, at timing $T_2$, where the end of Block A is reached, the execution of the NC program is automatically stopped and the in-operation flag of the RAM 53 is set to OFF.

After that, when the rotation of the handwheel 14 is stopped at a certain timing $T_3$ and then restarted at a certain given timing $T_4$, the execution of the NC program is automatically restarted from Block B, which is the next block succeeding Block A, in accordance with the restart signal output from the PLC unit 40 to the CNC unit 50. At this time, the in-operation flag of the RAM 53 is again set to ON.

In the above-described operation, it is assumed that, after the execution of the NC program is automatically stopped at the end of Block A, the handwheel 14 is rotated in a normal direction that is the same direction as before. This causes the NC program to be executed in a forward direction from the beginning of Block B as described above. In contrast, after the execution of the NC program is automatically stopped at the end of Block A, if the handwheel 14 is rotated in a counter direction to before, the NC program is executed in a reverse direction from the end of Block A.

As described above in detail, in the present embodiment, when the NC unit is operated with both the manual pulse mode and the single block mode selected, if the execution of the NC program is stopped at the end of the block and then the rotation of the handwheel 14 for the manual pulse generator 20 is restarted, the NC program is caused to be automatically started in synchronization with the restarting of the rotation of the handwheel 14.

In the present embodiment that is configured as above, the execution of the NC program can be automatically restarted in conjunction with the starting of the rotation of the handwheel 14 after the execution of the NC program has been stopped at the end of the block. Thus, when the NC unit is operated with both the manual pulse mode and the single block mode selected, the operator can restart the operation of the NC unit by simply performing a single operation, that is, rotating of the handwheel 14 for the manual pulse generator 20. This allows operability in restarting the operation to be improved and work efficiency in a production setup to be increased.

In the above-described embodiment, the functions of the block stop detecting section 101, rotation detecting section 102, and the control section 103 are provided in the PLC unit 40. However, alternatively, these functions may be provided in the CNC unit 50.

Also, in the above-described embodiment, the manual pulse mode is selected with the mode selection switches 11. However, the present invention is not limited to this. For example, the manual pulse mode may instead be automatically entered by the rotation of the handwheel 14 for the manual pulse generator 20 during stopping of the automatic operation.

It will be understood that the above-described embodiment is just one example of an embodiment for implementing the present invention and should not be interpreted as limiting the technical scope according to the present invention. In other words, the present invention can be implemented in a variety of forms without departing from the gist or the main features thereof.

What is claimed is:

1. A control apparatus of a machine tool configured to be operated in a manual pulse mode where an NC program is executed in response to a pulse signal generated by a manual pulse generator according to a rotation of a handwheel and in a single block mode where the NC program is executed and stopped for every block of the program, the control apparatus comprising:

a block stop detecting section that detects whether the execution of the NC program is stopped at an end of a block when both the manual pulse mode and the single block mode are selected;

a rotation detecting section that detects whether the rotation of the handwheel is stopped and then restarted after the execution of the NC program is detected to be stopped at the end of the block; and a control section that controls an operation of the machine tool such that the execution of the NC program is restarted from a next block in both the manual pulse mode and the single block mode when the rotation of the handwheel is detected to be stopped and then restarted.

2. A method of controlling an operation of a machine tool in a manual pulse mode where an NC program is executed in response to a pulse signal generated by a manual pulse generator according to a rotation of a handwheel and in a single block mode where the NC program is executed and then stopped for every block of the program, the method comprising:

determining whether the execution of the NC program is stopped at an end of a block when both the manual pulse mode and the single block mode are selected;

then determining whether the rotation of the handwheel for the manual pulse generator is stopped when the execution of the NC program is determined to be stopped at the end of the block, then determining whether the rotation of the handwheel is restarted when the rotation of the handwheel is determined to be stopped; and then controlling the operation of the machine tool so as to start the execution of the NC program from a next block when the rotation of the handwheel is determined to be restarted.

* * * * *